United States Patent
Huber et al.

(10) Patent No.: US 8,393,139 B2
(45) Date of Patent: Mar. 12, 2013

(54) DEVICE WITH SECONDARY JETS REDUCING THE NOISE GENERATED BY AN AIRCRAFT JET ENGINE

(75) Inventors: Jerome Huber, Toulouse (FR); Jean-Paul Bonnet, Poitiers (FR); Joel Delville, Poitiers (FR); Peter Jordan, Rom (FR); Francois Strekowski, Poitiers (FR)

(73) Assignees: Airbus Operations (S.A.S.), Toulouse (FR); Centre National de la Recherche Scientifique (CNRS), Paris (FR); Universite de Poitiers, Poitiers (FR)

( * ) Notice: Subject to any disclaimer, the term of this patent is extended or adjusted under 35 U.S.C. 154(b) by 233 days.

(21) Appl. No.: 12/935,445

(22) PCT Filed: Mar. 31, 2009

(86) PCT No.: PCT/FR2009/000376
§ 371 (c)(1),
(2), (4) Date: Sep. 29, 2010

(87) PCT Pub. No.: WO2009/133273
PCT Pub. Date: Nov. 5, 2009

(65) Prior Publication Data
US 2011/0030341 A1    Feb. 10, 2011

(30) Foreign Application Priority Data
Mar. 31, 2008   (FR) ..................................... 08 52123

(51) Int. Cl.
*F02K 3/04* (2006.01)
(52) U.S. Cl. ................ 60/264; 60/262; 60/231
(58) Field of Classification Search .................... 60/231, 60/262, 263, 264, 770, 226.1; 239/127.3, 239/265.17, 265.19, 265.23, 265.25; 181/220, 181/221; 415/914
See application file for complete search history.

(56) References Cited

U.S. PATENT DOCUMENTS
(Continued)

FOREIGN PATENT DOCUMENTS

| | | |
|---|---|---|
| EP | 1 580 418 | 9/2005 |
| FR | 1 195 859 | 11/1959 |
| FR | 2 872 549 | 1/2006 |
| WO | 02 29232 | 4/2002 |

OTHER PUBLICATIONS

U.S. Appl. No. 12/935,450, filed Sep. 29, 2010, Huber, et al.

(Continued)

*Primary Examiner* — Phutthiwat Wongwian
(74) *Attorney, Agent, or Firm* — Oblon, Spivak, McClelland, Maier & Neustadt, L.L.P.

(57) ABSTRACT

An aircraft jet engine including a wall centered about a longitudinal axis and surrounding a stream of gas ejected at a downstream end of the wall in the direction of the axis, primary ducts distributed at the periphery of the downstream end of the wall configured on command each to eject a jet of primary fluid to interact with the ejected stream of gas, the primary ducts of each pair converging towards one another near the downstream end of the wall so that the primary jets ejected form two sides of a triangle that meet at the vertex thereof in a view projected onto a plane perpendicular to a transverse plane, and secondary ducts each associated with each pair of primary ducts and configured on command to eject a jet of secondary fluid directed into the triangle formed by the primary jets.

18 Claims, 6 Drawing Sheets

U.S. PATENT DOCUMENTS

| | | | |
|---|---|---|---|
| 4,254,620 A * | 3/1981 | Wright et al. | 60/263 |
| 8,020,368 B2 * | 9/2011 | Bonnet et al. | 60/262 |
| 2005/0214107 A1 * | 9/2005 | Gutmark et al. | 415/1 |
| 2008/0134665 A1 * | 6/2008 | Birch et al. | 60/226.3 |
| 2010/0065680 A1 | 3/2010 | Huber et al. | |
| 2011/0000181 A1 * | 1/2011 | Oishi et al. | 60/39.5 |

OTHER PUBLICATIONS

U.S. Appl. No. 12/935,423, filed Sep. 29, 2010, Huber, et al.
U.S. Appl. No. 13/357,065, filed Jan. 24, 2012, Huber, et al.
International Search Report issued Nov. 6, 2009 in PCT/FR09/000376 filed Mar. 31, 2009.

* cited by examiner

Fig. 4a
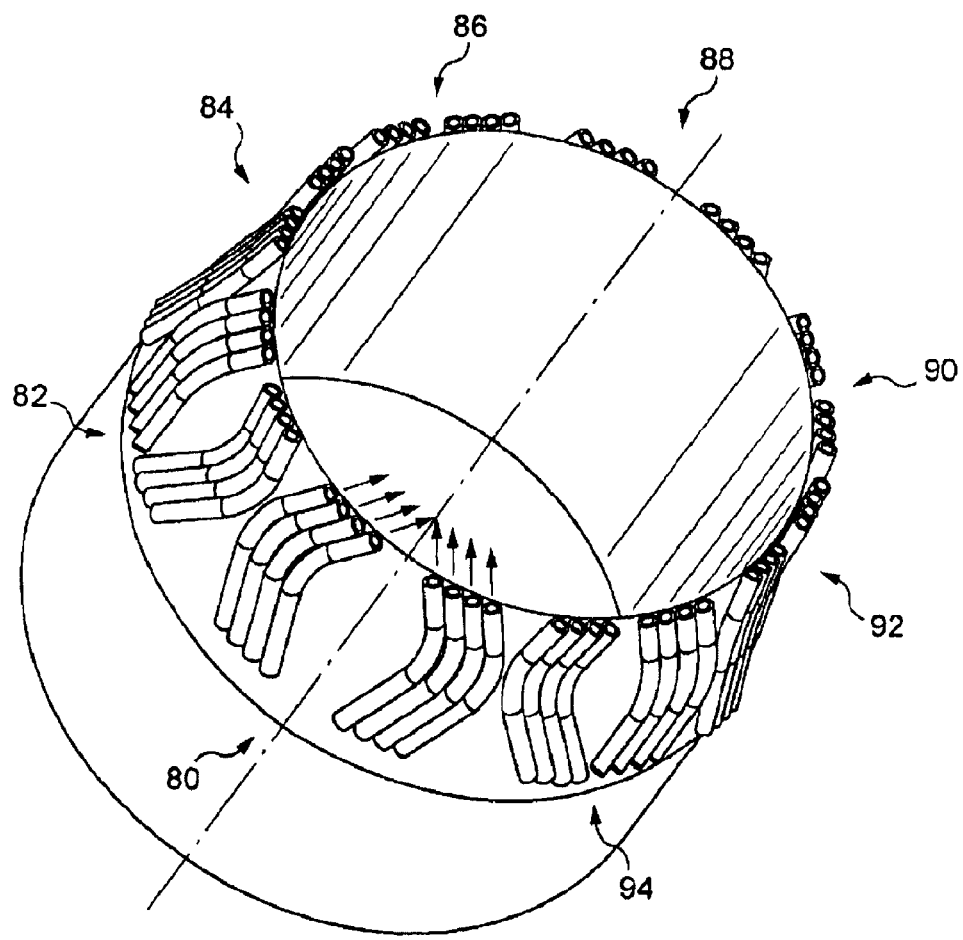
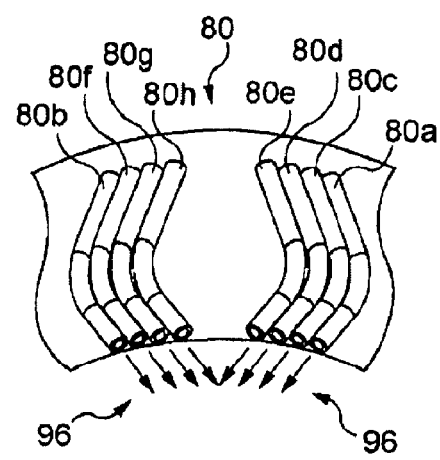
Fig. 4b

DEVICE WITH SECONDARY JETS REDUCING THE NOISE GENERATED BY AN AIRCRAFT JET ENGINE

BACKGROUND OF THE INVENTION

1. Field of the Invention

The invention relates to an aircraft jet engine.

2. Description of the Related Art

In known manner, an aircraft jet engine comes in the form of a nacelle in the center of which a turbomachine is positioned.

This nacelle is intended to be installed under the wing group of an aircraft by means of an engine nacelle pylon.

The turbomachine consists of a gas generator that drives a fan installed on the shaft of the gas generator, upstream from the latter along the longitudinal direction of the jet engine nacelle.

The air stream that passes longitudinally through the nacelle penetrates partially into the gas generator and takes part in combustion.

This stream is called primary stream and is ejected at the outlet of the generator.

The part of the air stream penetrating into the nacelle and that does not pass through the gas generator is carried along by the fan.

This stream, called secondary stream, flows in an annular passage, concentrically in relation to the primary stream. This passage is formed between an outer longitudinal wall (nacelle wall) and an inner longitudinal wall surrounding the gas generator.

The secondary stream is ejected from the nacelle at the downstream end of the outer wall of the latter along the more or less longitudinal direction of the jet engine.

The inner wall surrounding the generator for the gas also defines with an inner longitudinal part an annular passage through which the primary stream flows.

This stream is ejected at the downstream end of the inner wall that surrounds the gas generator.

During take-off phases, the gas stream that is ejected (primary and secondary stream) takes on very high speeds. At these speeds, the meeting of the ejected stream with the surrounding air, as does the meeting of the primary stream and the secondary stream, generates a considerable noise.

A fluidic device for reduction of noise generated by an aircraft jet engine is known from international application WO2002/013243.

This device comprises several pairs of ducts opening into the outlet of a nozzle of the jet engine that ejects a propulsive jet and which are distributed around the periphery of this nozzle.

The ducts of each pair each eject an air jet and are disposed in convergent manner in relation to each other in order to generate at the outlet a triangle of interaction of the air jets.

The angle of convergence of the ducts is between 40 and 70°.

This device is satisfactory for small nozzle sizes.

Nonetheless, when the diameters of the nozzles take on relatively high values, for example on the order of a meter, the aforementioned device loses its effectiveness.

The fluid jets originating from the convergent ducts in fact cannot interact with the entirety of the propulsive jet ejected by the nozzle. For this reason, a portion thereof meets the external peripheral flow of air, thus generating noise.

A need therefore exists to reduce the noise caused by the ejection of the gas stream or streams at the outlet of a jet engine nacelle of an aircraft, in particular when the dimensions of the jet engine are considerable.

BRIEF SUMMARY OF THE INVENTION

To this end, the invention has as an object an aircraft jet engine, comprising a wall centered around a longitudinal axis XX' and surrounding a gas stream that is ejected at a downstream end of the wall toward the axis, several pairs of ducts referred to as primary ducts distributed around the periphery of the downstream end of the wall, each being able to eject on command a primary fluid jet intended to interact with the ejected gas stream, the primary ducts of each pair converging toward one another near the downstream end of the wall so that the primary jets ejected form the two sides of a triangle that meet at the vertex thereof along a view in projection in a plane perpendicular to a transverse plane, characterized in that at least one duct referred to as secondary duct is associated with each pair of primary ducts and is able to eject on command a secondary fluid jet directed into the triangle formed by the primary jets.

The secondary fluid jet or jets associated with each pair of convergent primary fluid jets contribute to forming a fluidic zone nearly impermeable to the ejected gas stream.

By orienting the secondary duct or ducts or the outlet opening thereof toward the inside of the fluidic triangle formed by the primary jets, the inner zone of the triangle that is not swept by the primary jets is filled in with the secondary jet or jets directed in this way.

The gas stream ejected thus is channeled downstream by this or these secondary jet(s) and may interact with the convergent primary jets, giving rise to vortexes.

These vortexes are propagated downstream along the stream (in the longitudinal direction of the jet engine) and contribute to reducing the noise.

According to a first embodiment, the said at least one secondary duct is arranged between the two primary ducts of each pair, aligned with the height of the triangle formed by the jets originating therefrom.

In this way, a central secondary jet that is ejected from a central secondary duct runs through the interior zone of the triangle formed by the convergent primary jets, thus preventing the ejected gas stream from escaping radially.

According to a second embodiment, the said at least one secondary duct is arranged centrally between the two convergent primary ducts and is able to eject a fluid jet in the form of a sheet.

This jet more or less directed at the middle of the convergent primary jets creates between the latter a relatively wide fluidic barrier that acts as a deflector for the propulsive gas jet.

It therefore is possible to move the two primary ducts of the same pair away from one another.

This makes it possible to equip a jet engine nozzle with a fluidic acoustic attenuation device using fewer ducts than previously.

Moreover, the invention makes it possible to equip large-diameter jet engine nozzles in acoustically effective manner, even if the two primary ducts of each pair have a relatively large-size space between them.

According to one characteristic, the said at least one secondary duct is able to eject the fluid jet in the form of a sheet through an outlet opening that is oriented parallel to the height of the triangle formed by the primary jets.

According to a third embodiment, the jet engine comprises, associated with each primary duct, several secondary ducts disposed side by side and oriented parallel to the associated primary duct.

Several parallel secondary jets originating from the secondary ducts are associated with the convergent primary jets to cover the inner zone of the triangle formed by the latter.

The two types of jets brought together in this way for each pair of primary ducts form, as it were, convergent fluid sheets that form a fluidic shield with regard to the ejected gas stream.

This third embodiment also makes it possible to "close off" the zone located between the convergent primary fluid jets, around the periphery of the ejected gas stream and which, on large-size jet engines, was permeable to the gas stream, with the two convergent primary jets alone.

In this embodiment, the diameter of the outlet opening of the primary and secondary ducts may be identical or else vary.

For example, the diameter of the parallel ducts decreases as the secondary duct considered is moved away from the associated primary duct.

The number of secondary ducts is chosen, for example, according to the diameter of the downstream end of the wall through which the gas stream is ejected.

According to one characteristic, the primary ducts converge toward one another along a convergence angle ranging between 40 and 70° along a view in projection in a plane perpendicular to a transverse plane.

This marked convergence angle contributes to the effectiveness of the invention.

It will be noted that the secondary ducts associated with the two convergent primary ducts also are disposed along the same convergence angle.

According to another characteristic, the ducts are slanted toward the longitudinal axis along a penetration angle ranging between 8 and 60°.

This penetration angle also contributes to the effectiveness of the invention.

According to a characteristic linked to the preceding one, the slants toward the longitudinal axis of the associated primary and/or secondary ducts vary among the ducts.

It will be noted that the secondary duct or ducts associated with the primary ducts may take on the same slant as the primary ducts of the same pair, or a different slant.

Alternatively, the slant angles (penetration angles) on the longitudinal axis of the jet engine of the different associated primary and secondary ducts may vary instead of taking on a single value: the different pairs of ducts thus may be offset in relation to each other or be installed in staggered manner.

For example, the different ducts may be oriented so that the trajectories of the jets produced do not cross, thus limiting the spurious coupled effects.

According to one characteristic, the associated primary and/or secondary ducts are integrated into the wall, which makes it possible to reduce the space requirement.

According to one characteristic, the downstream end of the wall comprises a plurality of chevrons distributed around the periphery of the latter in order to form a mechanical acoustic attenuation device.

The chevrons interact with the gas stream originating from the downstream end where they are disposed, thus giving rise to vortexes that are propagated along the stream (in the longitudinal direction of the jet engine) and contribute to reducing the noise.

When the fluid ejection ducts are arranged with reference to the downstream end of the wall, the chevrons may be laid out at this same end in order to reinforce the effect of attenuation of the noise generated by the jet engine.

As a variant, the chevrons may be laid out at another downstream wall end that surrounds the outlet of another stream ejected from the jet engine.

According to another variant, the fluid ejection ducts and the chevrons may be integrated into the same downstream wall end, while another downstream wall end surrounding the outlet of another stream ejected from the jet engine also may be equipped with chevrons alone or with ducts alone or else with chevrons in cooperation with ducts.

According to one characteristic, the ducts are associated with chevrons that impart to the downstream end of the wall a jagged shape comprising a succession of peaks and valleys.

The fluidic jet coming out of each duct is associated with the longitudinal vortex generated at the associated chevron and thus reinforces its noise-reducing action.

The association of the fluid jets with the chevrons makes it possible:
- to extend the spatial impact of the chevrons, that is to say with identical effect, to have shorter chevrons (less penalizing in cruising) or with identical chevron size, to increase the effectiveness thereof,
- to create new spatial effects insofar as the jets interact with the propulsive jet in different positions starting from the trailing edge: this therefore makes it possible to have different pressure gradients, which may be favorable for the action of jets by amplifying their penetration, for example.

According to one characteristic, since each chevron comprises a slanting part connecting the peak to an adjacent valley, the primary ducts are designed with reference to the chevrons so that each fluid jet is ejected parallel to the direction of slant of one of the slanted parts of the corresponding chevron.

Each primary duct is, for example, arranged along one of these slanted parts of a chevron and its outlet opening is disposed at the peak of the chevron, while the central secondary duct is aligned along the median passing through the peak.

Arranged in this way, the ducts produce jets that extend, as it were, the effects of the chevrons by giving them an incidence. Thus, very dissymmetrical chevrons, as it were, are achieved, and fluidly, that is to say without penalizing aerodynamic performances in cruising.

The invention also has as an object an aircraft comprising at least one aircraft jet engine according to the brief presentation set forth above.

Other characteristics and advantages will become apparent from the description that is going to follow, provided solely by way of non-limitative example and presented with reference to the attached drawings, on which:

BRIEF DESCRIPTION OF THE DRAWINGS

FIG. 2b is an enlarged partial schematic view in perspective, seen from below, of the downstream end of FIG. 2a;

FIG. 3b is an enlarged partial schematic view, in a view from above, of the downstream end of FIG. 3a;

FIG. 4a is a schematic view in perspective of a nacelle wall downstream end equipped according to a third embodiment of the invention;

FIG. 4b is an enlarged partial schematic view, in a view from above, of the downstream end of FIG. 4a;

DETAILED DESCRIPTION OF THE INVENTION

Figure 1:
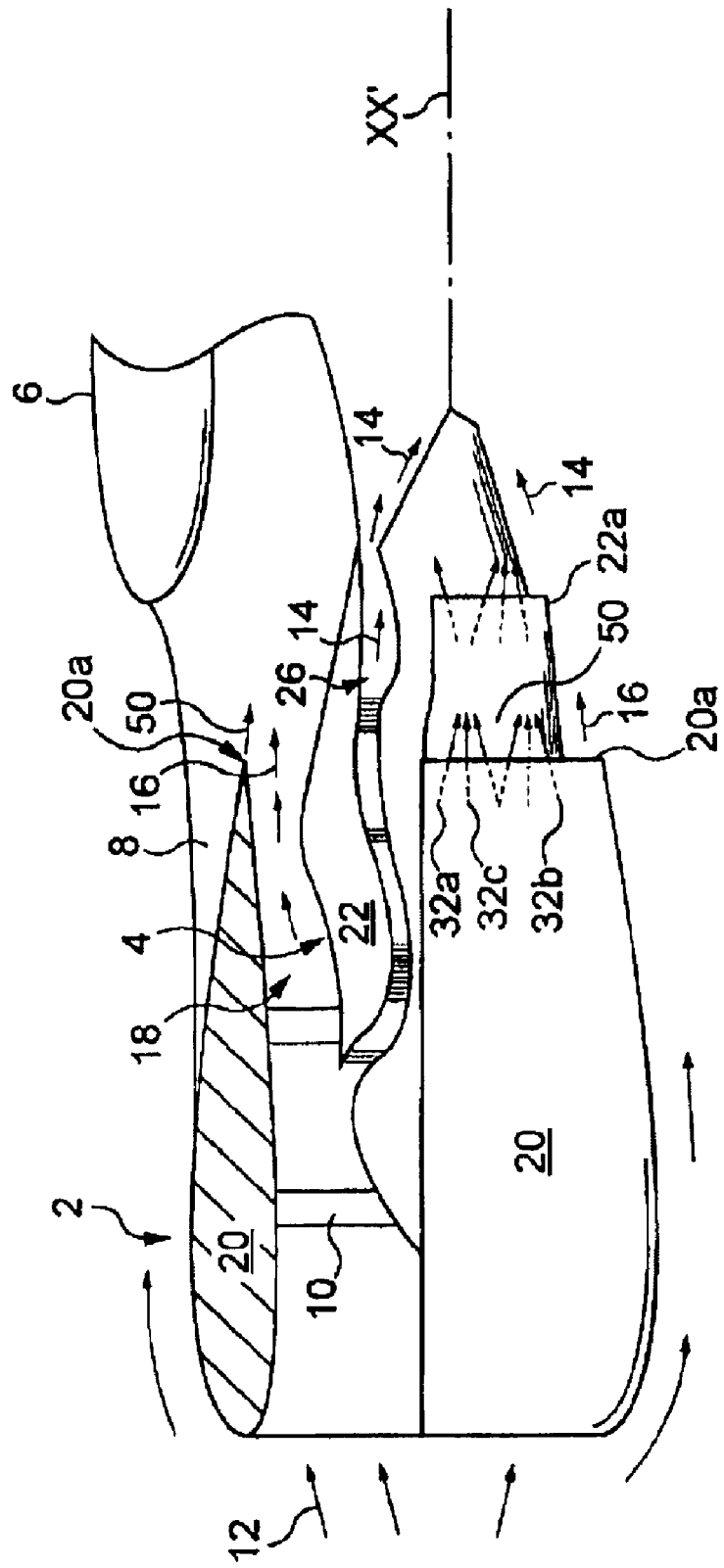
FIG. 1 is a general schematic view in longitudinal section of an aircraft jet engine in which only the upper part of the fan hood has been removed.

As shown in FIG. 1 and designated by the general reference marked 2, an aircraft jet engine nacelle envelops a turbomachine 4 and is installed under a wing 6 of an aircraft in known manner with an jet engine nacelle pylon 8.

The turbomachine 4 comprises a gas generator that drives a fan 10 mounted on the shaft of the generator, upstream from the latter along the longitudinal direction of the jet engine nacelle.

The nacelle has a revolution symmetry around the longitudinal axis XX'.

Air stream 12 that enters the nacelle, passes longitudinally through the latter, penetrates partially into gas generator 4 and participates in combustion.

Hot propulsive stream 14 ejected at the outlet of the generator is called primary stream.

The part of air stream 12 entering the nacelle and that does not pass through the gas generator is carried along by fan 10.

This cold propulsive stream 16, called secondary stream, flows in an annular passage 18 arranged concentrically in relation to the gas generator and therefore in relation to primary stream 14.

This passage 18 is formed between an outer longitudinal wall 20 (nacelle hood) and an inner longitudinal wall 22 (engine hood) surrounding the gas generator.

Secondary stream 16 is ejected from the nacelle at downstream end 20a of outer wall 20, more or less along the longitudinal direction of the jet engine.

Inner longitudinal wall 22 defining the outer casing of the gas generator defines with central longitudinal part 24, constituting the core of the engine, another annular passage 26 through which primary stream 14 flows.

This stream more particularly is ejected at downstream end 22a of inner wall 22.

A fluidic device for reduction of the sound level of the jet engine according to the invention is applied to the nacelle of jet engine 2 of FIG. 1.

This device is arranged, for example, with reference to the more or less cylindrical exterior wall 20 (exterior hood) of the nacelle and which surrounds annular passage 18 through which secondary stream 16 is ejected.

It also may be arranged with reference to interior wall 22 (interior hood) of the nacelle that surrounds turbomachine 4 and at the end of which primary stream 14 is ejected.

It will be noted that a fluidic device may be provided at one and/or the other of the two concentric walls (exterior and interior hoods).

More particularly, the fluidic device according to the invention is associated with a so-called downstream end 20a and/or 22a of the wall in question, at the trailing edge thereof (also called outlet lip).

The fluidic device according to the invention is capable of generating, on command, a disturbance of the flow immediately downstream from the downstream end of the wall around the exterior periphery of the stream (primary or secondary) ejected through this end.

This disturbance extends in the form of a fluidic triangle which is comparable, in its aerodynamic effects, to those produced by solid chevrons (jagged configuration of the downstream end of the wall).

It will be noted that the fluidic device according to the invention (which is capable of producing a fluidic disturbance of more or less triangular expanse) simply may be added to an existing jet engine nacelle nozzle, without calling into question the whole design and manufacture thereof.

The fluidic disturbance of triangular expanse modifies the manner in which the ejected stream meets the exterior stream (which is the air surrounding the nacelle when the ejected stream is the secondary stream) and interacts with the ejected stream in order to form vortexes that are propagated longitudinally downstream.

The aforementioned phenomenon has the purpose of reducing the noise generated by the jet engine equipped in this way, in particular during the phases of take-off and approach of the aircraft.

The device according to the invention may assume different forms of implementation and certain structures of the device are going to be described below.

Nonetheless, each of these structures provides the advantage of effectively reducing the noise generated by a large-size jet engine (for example, exterior ring diameter of the nacelle on the order of a meter).

This advantage is obtained by virtue of the fact that the fluidic disturbance of triangular expanse generated forms a fluidic shield (fluidic barrier) impermeable or nearly impermeable to the ejected stream (primary or secondary).

To accomplish this, the means constituting the device that are able to generate a fluidic disturbance of more or less triangular extent comprise a pair of ducts or pipes referred to as primary ducts or pipes disposed in convergent manner in relation to one another, These two primary ducts are each able to eject a primary fluid jet on command, and the two jets converge toward one another, thus forming the two sides of a triangle which converge at the vertex thereof.

One or more other ducts/pipes referred to as secondary ducts/pipes are added to the pair of primary ducts/pipes so that each ejects a secondary fluid jet into the disturbance of more or less triangular extent.

This or these secondary jet(s) reinforce the action of the disturbance and come to cover a zone of the fluidic triangle (interior zone) which, in the absence of these jets, is insufficiently covered by the convergent primary jets.

This is all the more true the larger the diameter of the hoods of the jet engine nacelle.

The action of the secondary jet or jets, added to that of the primary jets, thus makes it possible to inject, around the periphery of the ejected stream (primary or secondary), a fluidic flow in the form of a zone of more or less triangular extent that is impermeable to the stream ejected locally.

By appropriately arranging several of the aforementioned means around the periphery of the downstream end of the wall concerned, the stream ejected through the concerned part of the jet engine thus is able to be surrounded completely and therefore effectively.

Figure 2A:
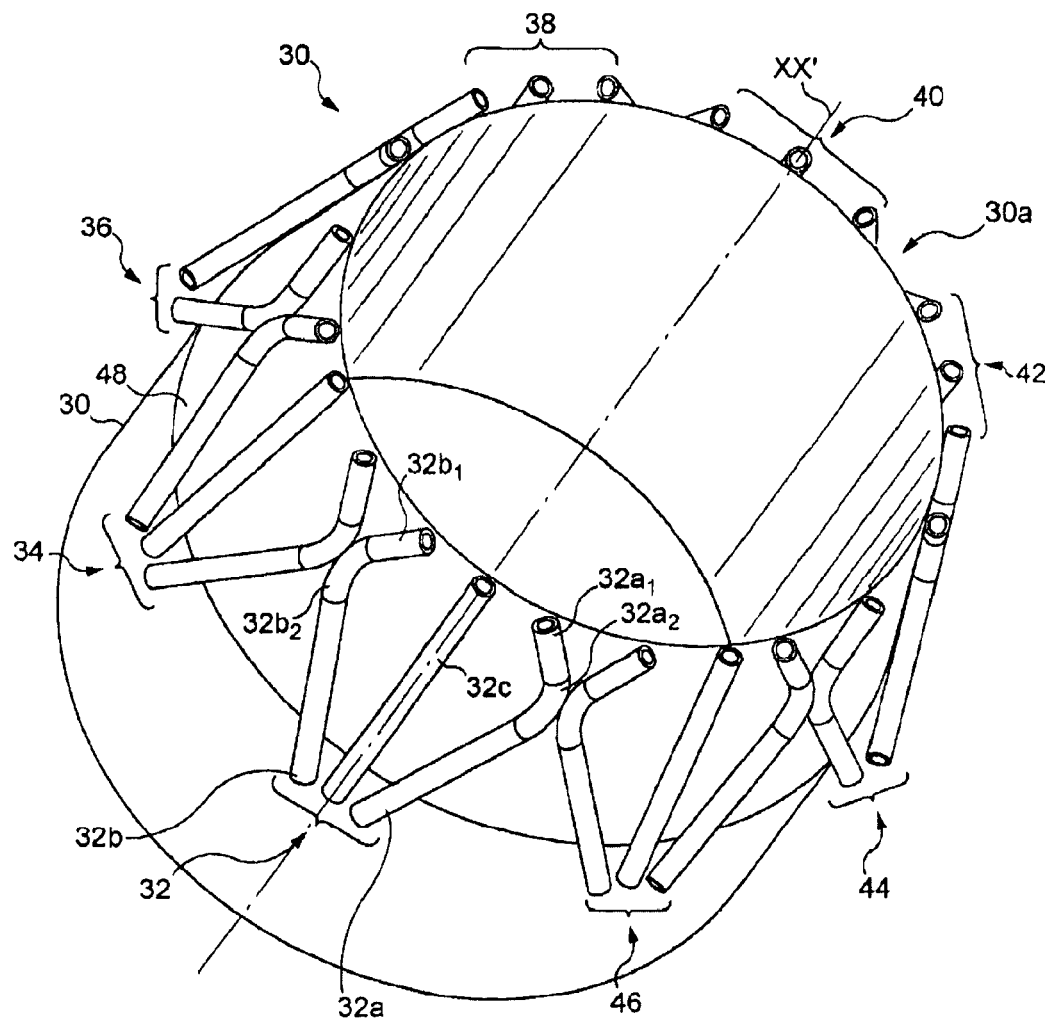
FIG. 2a is a schematic view in perspective of a nacelle wall downstream end equipped according to a first embodiment of the invention.

On FIG. 2a, several devices according to a first embodiment of the invention are provided on one of the two nacelle walls shown in FIG. 1 and which here is referenced 30. The wall shown in FIG. 2a forms a nozzle in which there flows a stream (primary or secondary) that is ejected at downstream end 30a of the wall.

Fluidic devices 32, 34, 36, 38, 40, 42, 44, 46 are, for example, regularly distributed around the exterior periphery of downstream end 30a of the wall, at outlet ring 48.

It will be noted that, in other embodiments, the devices may be integrated into the thickness of the wall or on the inner face thereof that is in contact with the flow of the ejected stream (primary or secondary).

It also should be noted that the devices may be distributed differently according to the azimuth.

This makes it possible, for example, to take into account the presence of the jet engine nacelle pylon 8 that modifies the flow.

This non-homogeneous arrangement also makes it possible to take into account the directivity of the noise and the regulatory constraints concerning noise in relation to vicinity. In fact, it is preferable to limit the noise radiated toward the ground than the noise radiated skyward.

The composition of the devices now is going to be described, taking as an example device 32, since all the other devices are identical thereto in this embodiment.

Device 32 comprises two primary ducts 32a, 32b that are connected, for example, via an air-supply pipe (not shown) to the high-pressure part of the jet engine. Supplied in this way with compressed air, the primary ducts each convey this air up to their outlet opening where it is ejected in the form of a primary jet.

Ducts 32a, 32b are configured so as to converge toward one another according to a convergence angle a1 ranging between 40 and 70° and which is, for example, equal to 60°.

Figure 2B:
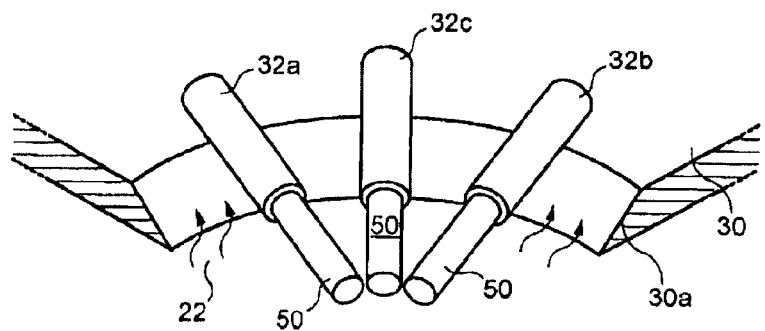
Figure 2C:
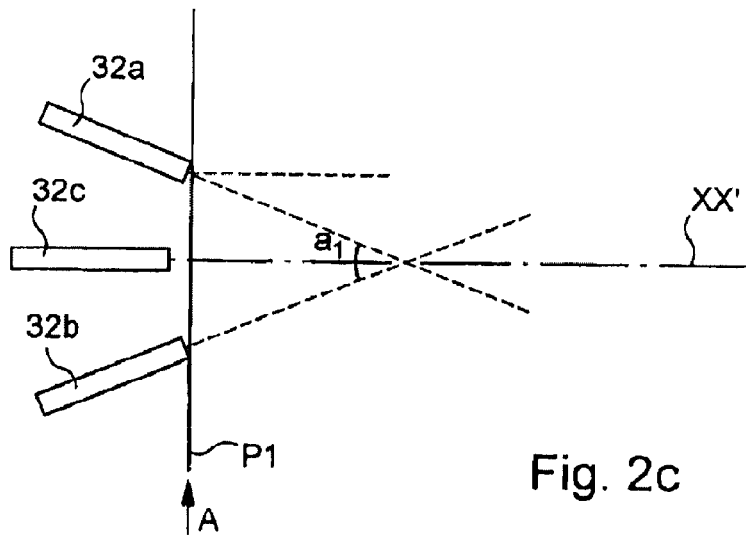
FIG. 2c is an enlarged partial schematic view, in a view from above, of the three ducts shown in FIG. 2b.

This angle a1 is visible on FIG. 2c which is a view in projection in a plan perpendicular to a transverse plane P1.

Angle a1 is an angle at the vertex of the triangle defined by the two primary fluid jets ejected by respective ducts 32a, 32b seen from above on FIG. 2c.

It will be noted that free ends 32a1, 32b1 of ducts 32a, 32b are upright and the slant is achieved by virtue of a bent portion 32a2, 32b2 arranged upstream from downstream portion 32a1, 32b1 including the free end (FIG. 2a).

Furthermore, primary ducts 32a, 32b also are slanted, at least in their terminal part, toward longitudinal axis XX', along an angle p called penetration angle.

Figure 2D:
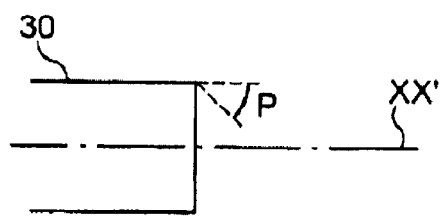
FIGS. 2d, 2e and 2f are partial schematic views along A showing the slant on the axis of the ducts.

Angle p is shown in FIG. 2d that is a view along the direction A of FIG. 2c and that shows, in a side view, the slant on axis XX' of the primary ducts.

This slant generally is achieved by virtue of the beveled shape of the trailing edge (outlet lip) of the downstream end of the wall, such as shown enlarged in FIG. 2d. Angle p generally is between 8° (slight penetration) and 60° (strong penetration). This slant makes it possible to increase the disturbance of the ejected stream by slanting the fluid triangles on the axis of the stream.

In this way, terminal portions 32a1 and 32b1 of primary ducts 32a, 32b are disposed against the slanted outer face of the trailing edge and take on the same orientation in relation to axis XX" as the trailing edge.

Figure 2E:
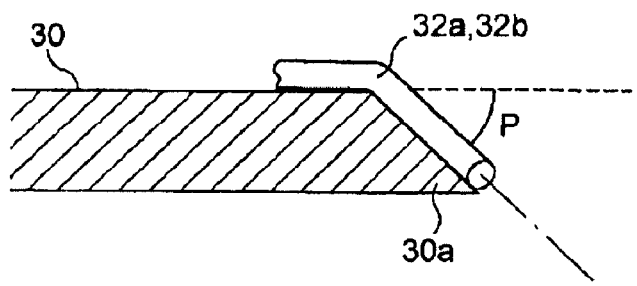
Figure 2F:
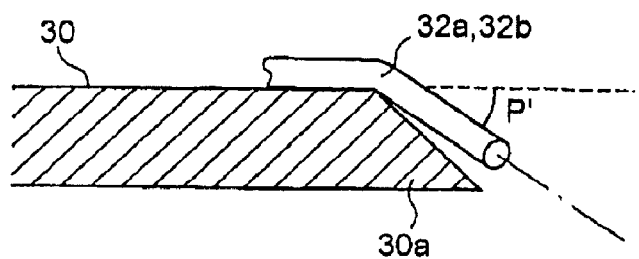

Nonetheless, the primary ducts alternatively may take on an orientation different (angle p') from that of the trailing edge as shown on FIG. 2f.

It will be noted that the slant moreover may be greater than that of angle p in another implementation variant.

According to another variant, primary ducts 32a, 32b each may be slanted according to a different penetration angle so that the primary jets originating from these ducts are not entirely concurrent in space (it will be noted that these jets are, despite everything, convergent along a view similar to that of FIG. 2a). In fact, the meeting of the two fully concurrent jets at one point is likely to produce spurious noise emissions without improving the gain in low frequency. It will be noted, however, that the angles are selected appropriately so that the jets oriented in this way are sufficiently close to one another, so as to avoid creating "gaps" in the fluidic coverage.

Thus the angles are selected, for example, so that the jets are offset from one another by about one jet diameter at their theoretical meeting point so that they do not meet.

Moreover, device 32 comprises a third duct 32c, referred to as secondary duct, arranged between two primary ducts 32a, 32b and which is also connected to a pipe for supply of compressed air having the same source as ducts 32a, 32b.

Secondary duct 32c is able to generate, on command, a secondary jet inside the fluidic triangle formed by the convergent primary jets (FIG. 2c).

More particularly, secondary duct 32c is aligned along the height of the fluidic triangle shown in FIG. 2c, so as to inject an additional jet around the periphery of the stream coming out of ring 48.

This additional jet contributes to making the fluidic zone of triangular extent nearly impermeable to the ejected stream.

By virtue of this central secondary jet, the two primary ducts of each pair may be spaced apart from one another along the same diameter located at the periphery of downstream end 30a so that the fluidic coverage of nearly triangular extent generated by the ducts limits the presence of "gaps" or of zones not covered.

In this way, the number of primary ducts to be provided in order to cover the entire periphery of a nozzle of considerable diameter on the order of a meter or of several meters may remain reasonable.

It will be noted that the lateral primary ducts and the central secondary duct each eject jets with more or less circular diameter.

The ducts of both types, namely primary and secondary, may have identical or different diameters and different outlet opening shapes according to the effect sought and the configuration of the outlet nozzle.

Moreover, according to a variant not shown, on the same outlet nozzle, the secondary duct may be present in some fluidic devices and be absent from some other fluidic devices.

In such a configuration, the primary ducts could be closer to one another in the devices not comprising a central secondary duct so that the fluidic triangular extent produced by the primary jets is as impermeable as possible to the ejected stream.

In the devices also comprising a central secondary duct, the primary ducts on the other hand could be farther away from one another.

Furthermore, the central secondary duct may take on a penetration angle identical to that of the primary ducts or different therefrom.

A different penetration angle makes it possible to avoid the effects of interaction between primary and secondary jets.

On FIG. 2a, the duct layouts have been shown by way of example so as to illustrate the convergence of the primary ducts.

Thus, terminal portions or ends $32a_1$, $32b_1$ of ducts 32a, 32b converge toward one another by virtue of respective bent portions $32a_2$, $32b_2$.

Upstream from these bent portions, the ducts diverge in relation to one another.

It is conceivable, however, that the secondary ducts all may be parallel to each other before meeting an adapted bent portion located upstream from ends $32a_1$, $32b_1$.

It will be noted that the secondary duct comprises a terminal portion that is bent in relation to the rest of the duct so as to follow the slant of trailing edge 30a shown in FIG. 2e.

It should be noted that the speed of the compressed air circulating in the primary and secondary ducts is more or less identical to the speed of the stream ejected by the nozzle (propulsive jet).

The weight ratio between the output of the air jets ejected by the ducts and that of the ejected stream is between approximately 0.2 and 2%.

According to a variant, the air jets may be supersonic according to the applications considered.

FIG. 2b shows the arrangement of the terminal part of three ducts 32a, 32b and 32c of device 32 with reference to trailing edge 30a and their slant.

The slant of the ducts gives jets 50 that originate therefrom a tangential speed component in relation to the speed of the propulsive jet. By reason of the interaction with the propulsive jet, this tangential component causes a rotation of jets 50 on themselves, in the opposite direction for two convergent jets originating from primary ducts 32a, 32b. This rotation may be favored by means such as those mentioned above. Furthermore, the aforementioned convergence angle leads the two convergent jets to meet at short range, a range between 0.2 and 0.5 times the outlet diameter of the nozzle.

When the implementation relates to the ring separating the cold exterior jet (secondary stream) and the hot central jet (primary stream), the rotation of jets 50 carries exterior cold air 52 along to the interior of the propulsive jet between the convergent jets, hot air 54, on the contrary, coming out again outside jets 50.

The result is a homogenization of the temperatures from the outlet of the nozzle, capable of contributing to the reduction of the noise generated by this nozzle. A heat-shield effect also is produced, likewise favorable for the reduction of the radiated noise.

In the example illustrated on FIG. 2a, the pairs of primary ducts are distributed so that the duct converging in one direction directly juxtaposes the duct of the adjacent pair and which has an opposite convergence.

Nevertheless, the spacing between the tubes of the same pair as well as the spacing of the adjacent tubes of two different pairs will depend on the number of tubes with which the nozzle is to be equipped and the diameter of the latter. In fact, in the example illustrated, the nozzle comprises eight pairs (32, . . . , 46) of pipes. It is obvious, of course, that here it is matter of an exemplary implementation given by way of illustration, the number of pairs of pipes being able to be lesser or greater than this number. The number of pairs of pipes added to the nozzle will depend in particular on the size of the jet engine, but also on the noise pollution of the jet engines.

Thus in order to reduce the noise linked to the propulsive jets of the jet engines at the time of the take-off phase or the approach phase of the airplane, a blast of compressed air is released through the air ducts right up to the ducts distributed at the outlet ring of the said nozzle. The ring in question may be the one (interior ring) separating the hot stream (primary stream) and the cold stream (secondary stream), or the one separating the cold stream (secondary stream) and the ambient air (nacelle ring). By virtue of the positioning of the ducts at the outlet ring, as well as their distribution, the compressed-air jets are propelled away from the ducts according to the convergence and penetration incidences, then disturbing the propulsive jet according to fluid interaction triangles in the direction of the flow.

The primary and secondary air jets constitute controlled jets. Connected to the high-pressure part of the jet engine, their supply is actuated only in phases where control is necessary (generally during take-off and landing phases).

Beyond these phases, the fluidic devices according to the invention are made inactive by mere cutoff of the compressed air duct. The aircraft equipped in this way shows no penalization in terms of drag or loss of thrust.

It will be noted that the primary and secondary jets may be activated independently of each other, in this way providing a particularly flexible system for disturbance of the ejected stream. Thus, a partial activation of the said jets may be considered: activation of the jets positioned on the top, the bottom, the right or the left of the said nozzle of FIG. 2a, thus modifying the directivity of the noise pollution.

According to another variant, the control jets may be activated in a non-steady manner in order to reduce the outputs of the control jets or to improve the control performances.

Figure 3B:
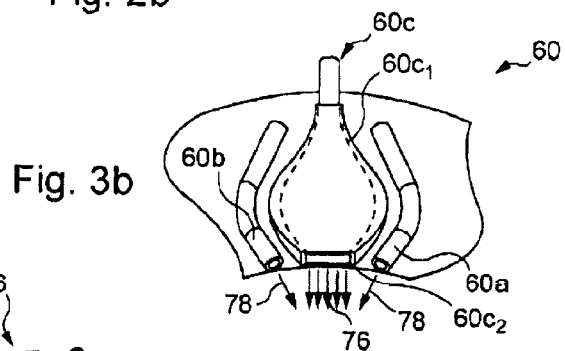
Figure 3A:
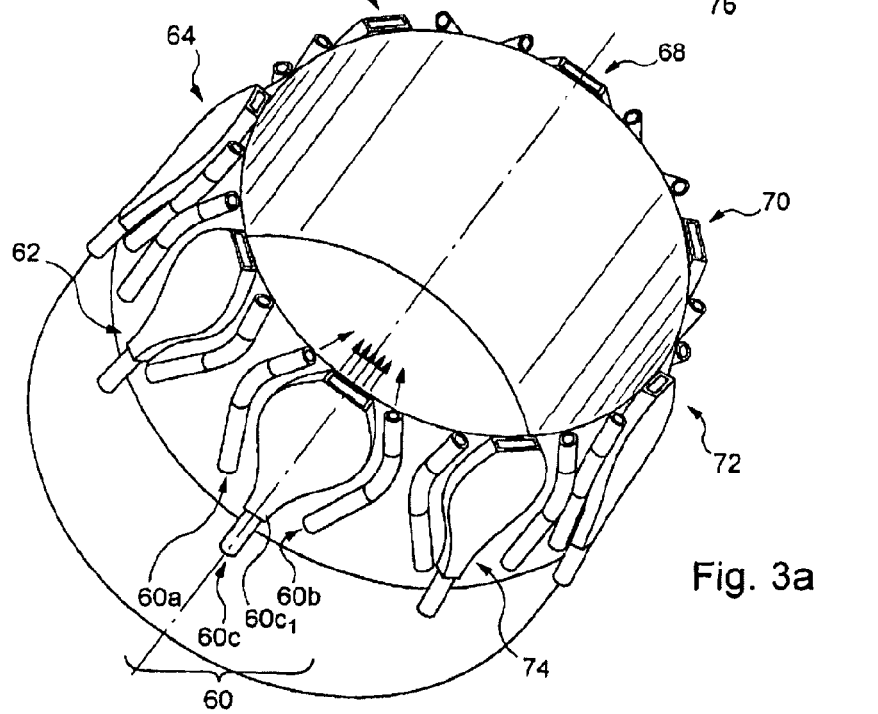
FIG. 3a is a schematic view in perspective of a nacelle wall downstream end equipped according to a second embodiment of the invention.

FIG. 3a illustrates the regular arrangement of several fluidic devices according to a second embodiment of the invention around the periphery of downstream end 30a of wall 30 shown in FIG. 2a.

Fluidic devices 60, 62, 64, 66, 68, 70, 72, 74 are all identical in this example and only one of them is going to be described now.

Device 60 comprises two convergent primary ducts 60a and 60b structurally and functionally identical to those 32a and 32b of device 32 of FIGS. 2a to 2f.

Furthermore, device 60 comprises a central secondary duct 60c disposed between two primary ducts 60a, 60b and which is connected to the same compressed air source as the latter. This duct 60c is able to generate, on command, a central secondary jet directed toward the interior of the fluidic disturbance of triangular extent produced by the two primary jets originating from ducts 62a, 62b. The central secondary jet is more particularly directed along the height of the fluidic triangle.

This secondary duct 60c comprises, in its terminal part, a widened shape (as a blacksmith's bellows would be) 60c1 that has a non-circular outlet opening 60c2, unlike that of secondary duct 32c on FIGS. 2a and 2b.

It will be noted, however, that this divergent/convergent shape is not mandatory. The shape of the terminal part of the duct upstream from the opening in fact may be different. The walls of this terminal part upstream from the opening may be, for example, parallel to one another.

Outlet opening 60c2 (slot) has, in cross-section, a shape wider than it is high, the height being measured along a radial direction in relation to longitudinal axis XX' and the width corresponding to an extension (lateral) along a tangent to the circular outline of downstream end 30a.

Outlet opening 60c2 has a general rectangular shape, for example, with height less than the diameter of the outlet opening of the primary ducts.

The central duct thus imparts a reduced height space requirement.

The flat shape of the outlet opening of the central duct makes it possible to generate, on command, a central secondary jet in the form of a fluidic sheet.

The fluidic sheets also may contribute to a thermal mixture when they are located on the engine hood by modifying the mixture between the hot gases of the engine stream (primary stream) and the cold gases of the secondary stream. The fluidic sheets generated in this way contribute to reducing the noise resulting from another noise source, namely the thermal gradients.

This more or less flat additional jet comes to reinforce the fluid triangle generated by the primary jets.

With such a secondary jet (referenced 76 on FIG. 3b), primary ducts 60a and 60b may be spaced farther apart from one another than primary ducts 32a and 32b of FIGS. 2a to 2e because this jet has a lateral extension greater than that of primary jets 78.

It therefore provides more coverage than secondary jet 50 of FIG. 2b.

By way of example, the cross-section of the outlet opening has a height or thickness less than half the diameter of the outlet opening of the primary ducts and a width or an extension of approximately 10 to 20 times this diameter.

More particularly, the height may be approximately equal to a third of the diameter of the outlet opening.

The addition of a central secondary duct 60c in each fluidic device or in only some of them with which the same nozzle is equipped, makes it possible to reduce the number of primary ducts used.

The fluid output conveyed by such a central secondary duct is more or less equivalent to that conveyed by several primary ducts, for example two or three primary ducts.

It will be noted that secondary duct 60c may be slanted on longitudinal axis XX' with the same penetration angle as that of the two primary ducts (or of only one of them if the two primary ducts have different angles), for example following the slant of the trailing edge of downstream end 30a.

Alternatively, the slant of the secondary duct may differ from that/those of the primary ducts, for example so as to prevent the different jets originating from the respective ducts from being concurrent and generating a possible spurious noise.

Alternatively, the primary jets may not be activated, the flat-shaped secondary jet then acting alone.

According to a variant, the outlet opening of the secondary jet may be shaped so as to give the secondary jet a natural slant different from the slant of the trailing edge of the hood.

FIG. 4a illustrates the regular arrangement of several fluidic devices according to a third embodiment of the invention and which are located around the periphery of downstream end 30a of the wall shown in FIG. 2a.

Fluidic devices 80, 82, 84, 86, 88, 90, 92 94 are all identical in this example and only one of them is going to be described now.

Device 80 (FIGS. 4a and 4b) comprises two convergent primary ducts 80a and 80b structurally and functionally identical to those 32a and 32b of device 32 of FIGS. 2a to 2f.

Furthermore, device 80 comprises, associated with the pair of primary ducts 80a, 80b, several secondary ducts having the same orientation as the primary ducts in the plane of FIG. 2c.

More particularly, among this plurality of secondary ducts, a first group of ducts (80c, 80d, 80e on FIG. 4b) is associated with primary duct 80a and a second group (80f, 80g, 80h) is associated with primary duct 80b.

Each group of secondary ducts is oriented like the primary duct with which they are associated and these parallel ducts are arranged side by side, placed together or otherwise.

The secondary jets originating from these secondary ducts therefore are parallel and sufficiently close to each other to form, with the associated primary jet, a cluster of nearly contiguous jets (cluster 96 on FIG. 4b) that sweep the entire fluidic triangle defined by the two convergent primary jets. The secondary jets more particularly cover the interior zone of the triangle.

The secondary ducts therefore are provided in pairs, each pair having one duct in one of the groups and the other duct in the other group.

The two secondary ducts of the same pair are disposed symmetrically to one another in the plane of FIG. 2c.

The pairs of secondary ducts thus are as follows: 80c and 80f, 80d and 80g, 80k and 80h.

It will be noted that the secondary ducts have, for example, the same penetration angle as that of the primary ducts.

The outlet or ejection openings of the secondary ducts have a diameter for example identical to that of the primary ducts.

By way of variant, the size of the openings, therefore of the ducts (and of the jets) nonetheless may vary: the secondary ducts the farthest away from the primary ducts have a smaller diameter than those that are close thereto, In general, the diameter of the secondary ducts decreases as the ducts come closer to the height of the fluid triangle (the distance to the axis of the triangle decreases).

It will be noted that, according to a variant, the penetration angles of ducts 80a to 80h may vary.

The penetration angles of both ducts of the same pair (primary and secondary ducts) may be different from one another in such a way that the trajectories of the fluid jets originating from these ducts do not cross. In this way, the spurious coupling effects produced by the meeting of both jets of the same pair are avoided. The angles are selected appropriately so that the jets deflected in this way are sufficiently close to one another so as to avoid creating "gaps" in the fluidic shield formed by these jets as a whole.

The penetration angles of the ducts thus may be varied within the same pair, and for several pairs, even for all the pairs.

Alternatively, the same penetration angle may be retained inside the same pair and the angles may be varied from one pair to the other.

Thus, for example, the penetration angle may decrease moving from the pair of primary ducts 80a, 80b to the pair of secondary ducts the farthest away 80c, 80h or, on the contrary, increase.

These variants of penetration angles make it possible to avoid spurious effects among different jets.

According to a variant not shown, a central duct producing a central jet may be inserted between the clusters of ducts of FIGS. 4a and 4b.

The central duct may be similar to that of FIGS. 2a to 2f or be a central duct producing a flat jet such as that of FIGS. 4a and 4b.

It will be noted that the primary and secondary ducts or pipes may be integrated into the thickness of the wall (hood) of the nacelle and therefore take on angles different from those of the wall.

Figure 4C:
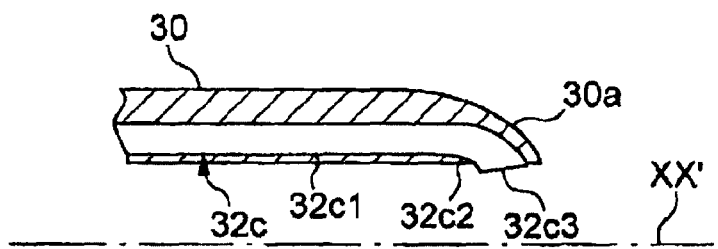
FIG. 4c schematically illustrates the installation of a duct in the wall of the nacelle.

FIG. 4c thus illustrates a variant in which there has been shown in a profile view a single duct in accordance with the invention and that is arranged inside wall 30 along the direction of extension (longitudinal) of the wall.

This duct is, for example, one of the secondary ducts of FIG. 2a, such as duct 32c.

This duct 32c comprises a straight portion $32c_1$ and a portion of duct $32c_2$ forming a bend in relation to the straight portion so as to give outlet opening $32c_3$ of the duct the desired orientation (penetration angle and if need be lateral angle).

The bend is sufficiently short so that the outlet opening emerges level with the wall or in close proximity thereto.

The duct portion forming the bend may have a continuous curve and, for example, be produced by bending.

Alternatively, the portion forming the bend may be formed by an upright duct portion connected to the straight portion along a connecting angle.

The preceding description of FIG. 4c applies to each of the primary and secondary ducts shown on one of the foregoing Figures.

It will be noted, moreover, that installation of the ducts in the wall makes it possible not to increase the space requirement and not to penalize aerodynamic performances.

Figure 4D:
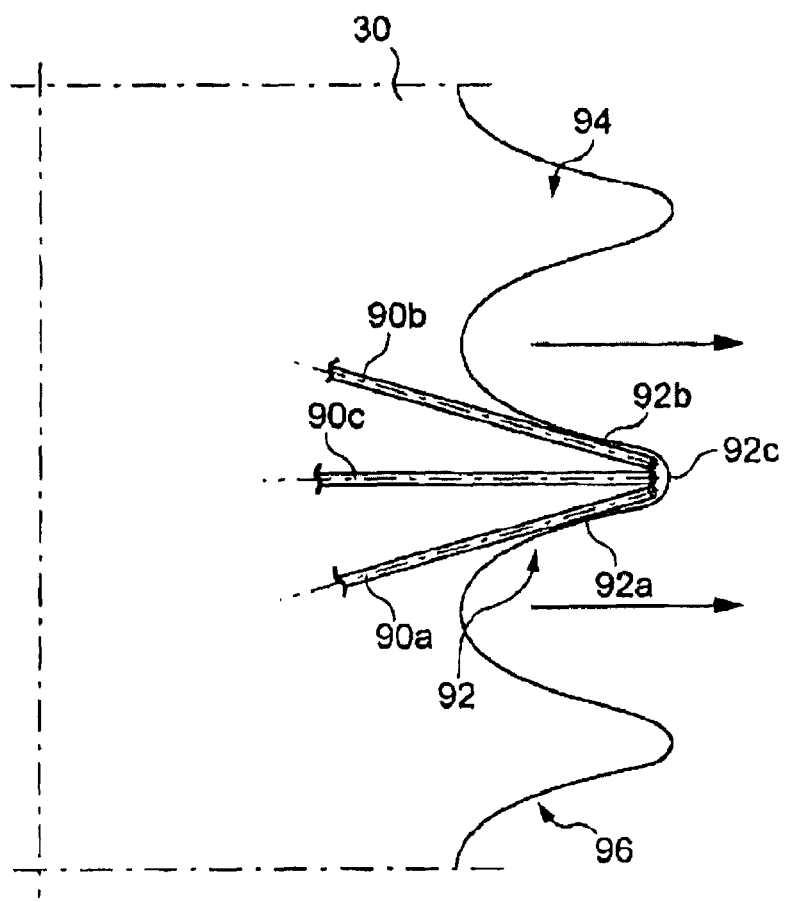
FIG. 4d schematically illustrates the association of ducts and chevrons.

On FIG. 4d there has been shown very schematically the arrangement of two primary ducts 90a, 90b and a central secondary duct 90c with reference to chevron 92 arranged at the downstream end of wall 30 of the nacelle so as, in particular, to amplify the effects produced by the chevron.

The downstream end comprises a plurality of successive chevrons only three of which 92, 94, 96 are shown, and each chevron may be equipped with a fluidic device comprising three ducts 90a, 90b, 90c.

In this embodiment, two primary ducts 90a, 90b are disposed respectively along slanted portions 92a, 92b of the chevron (these slanted portions connect the peak of the chevron to a valley located between two adjacent chevrons) with their outlet opening turned toward peak 92c of the chevron. Secondary duct 90c is disposed along the median of the chevron that passes through the peak of the latter with the outlet opening oriented toward this peak.

It will be noted that other arrangements of the primary and secondary ducts may be considered with reference to the chevrons.

For example, the three outlet openings of the three ducts could be directed on a valley between two chevrons, replacing or in addition to the arrangement of FIG. 4d.

It will be noted that the different arrangements of FIGS. 3a, 3b and 4a, 4b also may be associated with chevrons to cooperate with the latter as allowed by the arrangement of FIGS. 2a and 2b.

The invention claimed is:

1. An aircraft jet engine, comprising:
   a wall centered around a longitudinal axis and surrounding a gas stream that is ejected at a downstream end of the wall toward the axis;
   plural pairs of primary ducts distributed around a periphery of the downstream end of the wall, each configured to eject on command a primary fluid jet to interact with the ejected gas stream, the primary ducts of each pair converging toward one another close to the downstream end of the wall so that the ejected primary jets form two sides of a triangle that meet at a vertex thereof along a view in projection in a plane perpendicular to a transverse plane of the wall centered around the longitudinal axis,
   wherein at least one secondary duct is on the same surface as each pair of primary ducts and is configured to eject on command a secondary fluid jet directed into the triangle formed by the primary jets.

2. A jet engine according to claim 1, wherein the at least one secondary duct is arranged between two primary ducts of each pair, aligned with the vertex of the triangle formed by the jets originating therefrom.

3. A jet engine according to claim 1, wherein the at least one secondary duct is arranged centrally between two convergent primary ducts and is configured to eject a fluid jet in a form of a sheet.

4. A jet engine according to claim 3, wherein the at least one secondary duct is configured to eject the fluid jet in a form of a sheet through a rectangular outlet opening that is oriented parallel to a height of the triangle formed by the primary jets.

5. A jet engine according to claim 1, comprising, associated with each primary duct, plural of the secondary ducts disposed side by side and oriented parallel to the associated primary duct.

6. A jet engine according to claim 1, wherein each primary ducts converges toward one another along a converges angle ranging between 40° and 70° along a view in projection in the plane perpendicular to the transverse plane of the wall centered around the longitudinal axis.

7. A jet engine according to claim 1, wherein at least one of the primary or secondary ducts are slanted toward the longitudinal axis along a penetration angle ranging between 8° and 60°.

8. A jet engine according to claim 7, wherein at least one of the associated primary or secondary ducts have various slant angles toward the longitudinal axis.

9. An aircraft jet engine according to claim 1, wherein the primary and secondary ducts are integrated into the wall.

10. An aircraft comprising at least one jet engine according to claim 1.

11. A jet engine according to claim 1, wherein the at least one secondary duct is configured to eject a fluid jet in a form of a sheet through an opening with a width of the cross section being greater than a height of the cross section, and the height being less than half a diameter of an outlet opening of the primary ducts.

12. A jet engine according to claim 1, wherein the primary ducts converge along slanted portions of a chevron, and wherein the at least one secondary duct is configured to pass through a peak of the chevron.

13. A jet engine according to claim 1, wherein the primary ducts can be activated independently of the secondary ducts, and the secondary ducts can be activated independently of the primary ducts.

14. A jet engine according to claim 5, wherein a diameter of the secondary ducts decreases as the ducts come closer to a height of the triangle formed by the primary jets.

15. A jet engine according to claim 1, wherein a weight ratio of the primary and secondary air jets to the ejected stream is between 0.2 and 2%.

16. A jet engine according to claim 1, wherein a speed of the primary and secondary jets is on the same order as a speed of the ejected gas stream.

17. A jet engine according to claim 1, wherein at least one of the primary or secondary jets is activated in a non-steady manner.

18. A jet engine according to claim 1, wherein the primary jets intersect at a distance between 0.2 and 0.5 times a diameter of the downstream end of the wall.

* * * * *